(No Model.)

A. GRUNDY.
FREIGHT CAR.

No. 286,197. Patented Oct. 9, 1883.

WITNESSES:
C. Neveux
C. Sedgwick

INVENTOR:
A. Grundy
BY Munn & Co
ATTORNEYS.

UNITED STATES PATENT OFFICE.

ARTHUR GRUNDY, OF NEW YORK, N. Y., ASSIGNOR TO HIMSELF, HENRY A. LANDGRAFF, AND EDMUND TAPSCOTT, OF SAME PLACE.

FREIGHT-CAR.

SPECIFICATION forming part of Letters Patent No. 286,197, dated October 9, 1883.

Application filed November 2, 1882. (No model.)

*To all whom it may concern:*

Be it known that I, ARTHUR GRUNDY, of the city, county, and State of New York, have invented a new and Improved Freight-Car, of which the following is a full, clear, and exact description.

The object of my invention is to provide a new and improved freight-car, which can be loaded very rapidly and easily with large and bulky material.

Reference is to be had to the accompanying drawings, forming part of this specification, in which similar letters of reference indicate corresponding parts in all the figures.

Figure 1:
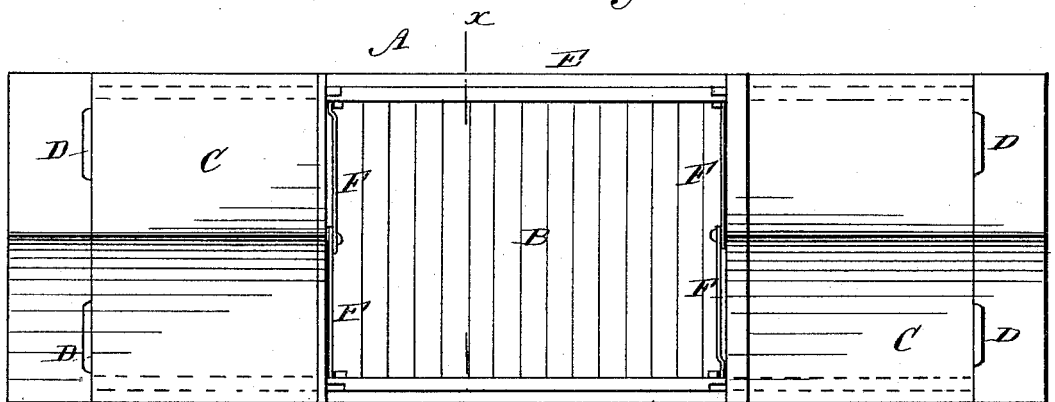
Figure 2:
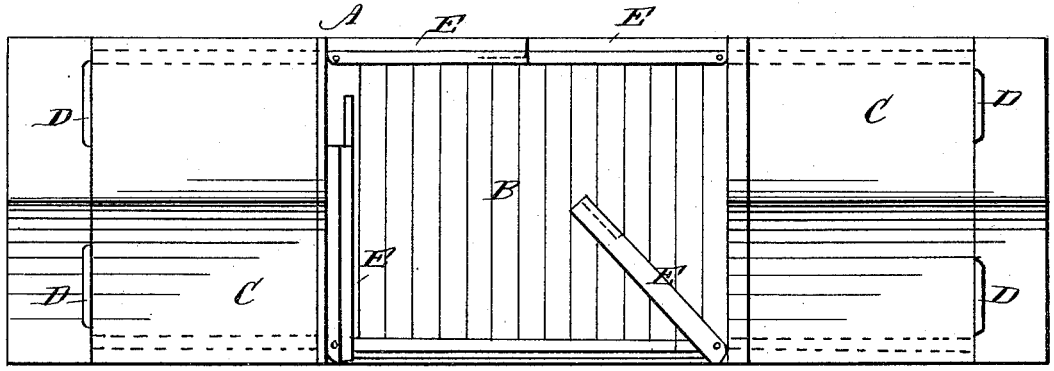
Figure 3:
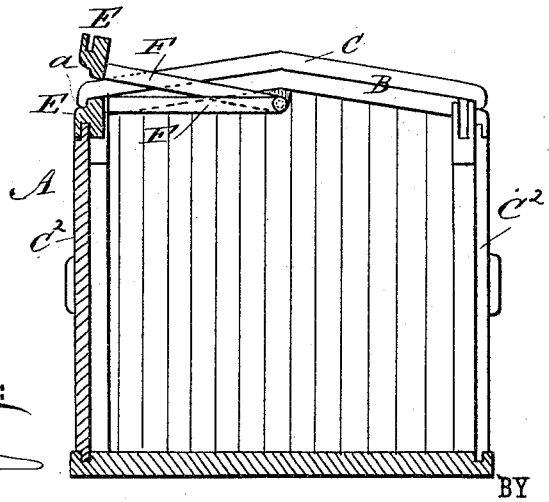

Figure 1 is a plan view of my improved freight-car, showing the roof-doors open and the upper side rails hinged by bars to the roof-center. Fig. 2 is a plan view of the same modified, showing the roof-doors open and the two-part top rails of the side-door openings swung inward. Fig. 3 is a cross-sectional elevation of my improved freight-car on the line $x\ x$, Fig. 1.

The freight-car A, which, in general, is of the usual construction, is provided in its roof with a large opening, B, which can be closed by sliding doors C on the roof of the car. The outer longitudinal edges of the said sliding doors C are bent downward and enter guide-rabbets $a$ in the longitudinal top rails of the car, as shown in Fig. 3. Check-blocks D are provided on the roof of the car, near the ends of the same, for the purpose of preventing the sliding doors C from being moved off the roof of the car entirely. The car is also provided with side doors, $C^2$, and in case very bulky material is to be loaded it may be desirable to remove the side top rails of the car, in addition to opening the top and side doors of the car. To permit this, I have attached the ends of the top rail, E, over the side openings in the car, to the free ends of bars or rods F, which are hinged or pivoted to the middle of the ends of the roof-opening B, thus permitting the top rail, E, at either side of the car being swung over to the other side, so that one large opening will be formed in the top and side of the car, as shown in Figs. 1 and 3.

If desired, each top rail, E, over a side opening of the car can be composed of two sections, which are hinged to the ends of the fixed top rails, the said hinged sections of the side rails being provided with a groove and tenon or other locking devices at the free ends, as shown in Fig. 2. The removable top rail, E, must be rabbeted in the same manner as the fixed and permanent part of the top rail, so that the doors C can slide freely on the roof of the car.

It is evident that if bulky material—such as hay, cotton, &c.—is to be loaded into or unloaded from a car the labor is greatly facilitated if the car can be opened in the manner shown and described.

Having thus described my invention, what I claim as new, and desire to secure by Letters Patent, is—

1. The combination, on a car, with rails E, arranged at the upper corners thereof, of the rods F, pivoted at the middle of the roof-opening, whereby the rods F will hold said rails in place, and are adapted to transfer them to either side, as described.

2. In a car, the combination, with the top and side movable doors, C $C^2$, of a rail, E, arranged at each side of the car, having an open rabbet at the top, and provided with a groove at the bottom to receive correspondingly-constructed edges on said covers, as and for the purpose specified.

3. The combination, with a freight-car having an opening in its top, of sliding doors on the roof, and removable top rails over the side-door openings of the car, substantially as herein shown and described, and for the purpose set forth.

4. The combination, with the car A, having an opening, B, in its roof, of the sliding doors C on the roof, the removable top rail, E, and the bars F, attached to the ends of the rail E, and pivoted to the car-roof, substantially as herein shown and described, and for the purpose set forth.

5. A freight-car constructed with removable top rails over the side-door openings, substantially as herein shown and described, and for the purpose set forth.

ARTHUR GRUNDY.

Witnesses:
OSCAR F. GUNZ,
C. SEDGWICK.